United States Patent
Yoshida

[11] Patent Number: 5,917,623
[45] Date of Patent: Jun. 29, 1999

[54] WAVELENGTH DIVISION MULTIPLEXING SYSTEMS

[75] Inventor: Takashi Yoshida, Tokyo, Japan

[73] Assignee: NEC Corporation, Tokyo, Japan

[21] Appl. No.: 09/081,556

[22] Filed: May 20, 1998

[30] Foreign Application Priority Data

May 22, 1997 [JP] Japan ................................. 9-132323

[51] Int. Cl.$^6$ ................................. H04J 14/02
[52] U.S. Cl. ................. 359/124; 359/110; 359/187
[58] Field of Search ............................ 359/124, 110, 359/127, 187, 173, 188

[56] References Cited

U.S. PATENT DOCUMENTS 5,745,275   4/1998   Giles et al. ................................. 359/124
5,847,856   12/1998  Imai et al. ................................. 359/110

*Primary Examiner*—Kinfe-Michael Negash
*Attorney, Agent, or Firm*—McGinn & Gibb, P.C.

[57] ABSTRACT

A wavelength division multiplexing system includes a first optical output level detector for detecting an optical output level of a first signal light transmitted on a transmission line, a signal light transmitter for transmitting an additional signal light to be multiplexed with the first signal light, and an optical coupler for multiplexing the additional signal light with the first signal light. The optical output level of the additional signal light is controlled on the basis of the optical output level of the first signal light transmitted on the transmission line.

37 Claims, 4 Drawing Sheets

WAVELENGTH DIVISION MULTIPLEXING SYSTEMS

BACKGROUND OF THE INVENTION

1. Field of the Invention

The present invention relates to wavelength division multiplexing (WDM) systems, and more particularly, it relates to WDM systems having a function that a signal light is dropped or added at each repeater or the like in a WDM system.

2. Description of the Related Art

In optical transmission systems for the communication from one end office to another end office and optical transmission systems having a ring path for the optical transmission, there are systems including optical repeaters or nodes. In those optical repeaters, there is an optical repeater having functions of not only amplifying signal lights but also dropping a specific signal light from signal lights transmitted through that node and adding a new signal light to transmitted signal lights.

FIG. 1 shows a prior art ADD multiplexer for adding a signal light to transmitted signal lights. A signal light output at an optical transmitter 5 is sent through an optical divider 3 to an optical coupler 1, in which the signal light is multiplexed and added to WDM signal lights on a transmission line. The other output of the optical divider 3 is input to an output controller 6 after being converted into an electric signal in a photoelectric converter 4. The output controller 6 controls the output of the optical transmitter 5 to keep the input from the photoelectric converter 4 constant. By the above operation, the output of the signal light to be added is kept constant.

In the WDM system in which signal lights having a plurality of wavelengths different from one another are wavelength-division-multiplexed, it is required to adjust the output of a newly added signal light in accordance with transmitted wavelength-division-multiplexed (WDM) signal lights. In the case that the new signal light is added to the WDM signals on the transmission line with an ADD multiplexer, if the peak output of the added signal light is not equal to those of the other channels, the S/N ratio is deteriorated when multi-stage repeats are performed with optical amplifiers. Accordingly, the peak output of the newly added signal light must be equalized to those of the other channels. However, in the system that the transmission output of the optical transmitter is kept constant as the above prior art, a level difference is generated between the newly added signal light and the transmitted WDM signal lights when the peak output of the WDM signal lights on transmission line varies due to a variation of the transmission line loss or the like.

SUMMARY OF THE INVENTION

Accordingly, it is an object of the present invention to provide wavelength division multiplexing systems in which the level difference between transmitted signal lights and a newly multiplexed and added signal light is decreased and levels of signal lights after multiplexing are equalized.

Wavelength division multiplexing systems according to the present invention comprise a first optical output level detector for detecting an optical output level of a first signal light transmitted on a transmission line, a transmitter for transmitting an additional signal light to be multiplexed with the first signal light, and an optical coupler for multiplexing the additional signal light with the first signal light. The optical output level of the additional signal light is controlled on the basis of the optical output level of the signal light transmitted on the transmission line.

The first optical output level detector comprises a first optical divider for dividing the first signal light to output a first divided signal light, and a first photoelectric converter for converting the first divided signal light into a first electric signal. An optical output level of the additional signal light is detected by a second optical output level detector. The second optical output level detector comprises a second optical divider for dividing the second signal light to output a second divided signal light, and a second photoelectric converter for converting the second divided signal light into a second electric signal.

An output controller controls the optical output level of the additional signal light so that the ratio of a first optical output level to a second optical output level is within a predetermined range. Otherwise, the output controller may control the optical output level of the additional signal light so that the first optical output level becomes equal to the second optical output level.

The transmitter includes an optical semiconductor laser for outputting the additional signal light. The output controller controls the optical output level of the additional signal light by controlling the injection current to the optical semiconductor laser.

Wavelength division multiplexing systems according to the present invention can also be applied even in the case of the first signal light being formed of wavelength-division-multiplexing a plurality of signal lights having different wavelengths from one another. In that case, the output controller controls the optical output level of the additional signal light so that the first optical output level to the second optical output level becomes the same multiple as the number of the signal lights included by the wavelength-division-multiplexed signal lights.

By the above construction, in a wavelength division multiplexing system, it becomes possible that the total optical output of wavelength-division-multiplexed signal lights on a transmission line and the optical output of a signal light to be added to the transmission line are monitored at a spot where a constant number of channels are always present on the transmission line, and the output of the signal light to be added is controlled so that the ratio of the optical output of the additional signal light to the wavelength-division-multiplexed signal lights becomes constant. In a wavelength division multiplexing system, it becomes also possible that the outputs of a dropped signal light and a signal light to be added are monitored at a spot where dropping a signal light and adding a signal light are performed at the same time, and the output of the signal light to be added is controlled so that the ratio of the output of the additional signal light to the output of the dropped signal light becomes always constant.

As another aspect, wavelength division multiplexing systems according to the present invention can also be applied to a system having an ADD-drop multiplexer (ADM) including an input port for inputting wavelength-division-multiplexed signal lights, a drop de-multiplexer, and a signal light adder. At the input port, wavelength-division-multiplexed signal lights in which a plurality of signal lights having different wavelengths from one another are wavelength-division-multiplexed and which is transmitted on a transmission line, is input. In the drop de-multiplexer, the signal light having a specific wavelength is selectively extracted from the wavelength-division-multiplexed signal lights. An optical output level of a dropped signal light extracted in the drop de-multiplexer is detected by a first optical output level detector. A signal light to be added is sent from a transmitter. The additional signal light is multiplexed with the wavelength-division-multiplexed signal lights in the signal light adder to be sent to the transmission line. The optical output level of the additional signal light is established on the basis of a first optical output level.

An optical output level of the additional signal light is detected by a second optical output level detector. An output controller controls the optical output level of the additional signal light so that the ratio of the first optical output level to a second optical output level is within a predetermined range. Otherwise, the output controller controls the optical output level of the additional signal light so that the first optical output level becomes equal to the second optical output level.

The drop de-multiplexer includes an optical filter through which only lights having specific wavelengths can permeate. Otherwise, the drop de-multiplexer includes a variable optical band-pass filter which extracts the signal light having a specific wavelength by selecting the wavelength in accordance with an external signal. For such a variable optical band-pass filter, an acousto-optic variable band-pass filter can be used.

In a wavelength division multiplexing system, the outputs of a dropped signal light and a signal light to be added are monitored at a spot where dropping a signal light and adding a signal light are performed at the same time. The output of the signal light to be added can be controlled so that the ratio of the output of the additional signal light to the output of the dropped signal light becomes always constant. In a wavelength division multiplexing system, signal lights on a transmission line are divided at a spot where only addition of a signal light is performed. An arbitrary channel is dropped with the variable optical band-pass filter and its output is monitored. The output of a signal light to be added is also monitored. The output of the signal light to be added is controlled so that the ratio of the output of the additional signal light to the output of the dropped channel becomes always constant.

In the above construction, wavelength division multiplexing systems according to the present invention include a maximum optical output level detector for detecting an optical output level of the signal light having the maximum peak output among the plurality of signal lights included by the wavelength-division-multiplexed signal lights. The optical output level of the additional signal light can be controlled on the basis of the maximum peak output.

The wavelength division multiplexing systems further include an additional light output level detector for detecting an optical output level of an additional signal light to output an additional signal light output level. An output controller controls the optical output level of the additional signal light so that the ratio of the maximum peak output to the additional signal light output level is within a predetermined range. Otherwise, the output controller may control the optical output level of the additional signal light so that the peak output of the additional signal light becomes equal to the maximum peak output.

The maximum peak output detector includes a first optical divider for dividing wavelength-division-multiplexed signal lights to output a first divided signal light, and a first photoelectric converter for converting the first divided signal light into a first electric signal. The additional signal light output level detector includes a second optical divider for dividing the additional signal light to output a second divided signal light, and a second photoelectric converter for converting the second divided signal light into a second electric signal. The maximum peak output detector includes a variable optical band-pass filter allowing only a specific wavelength light among the wavelength-division-multiplexed signal lights to permeate and outputting a permeation signal light, a wavelength sweeper for sweeping over wavelength by varying the specific wavelength in the variable optical band-pass filter, a third photoelectric converter for converting the permeation signal light into an electric signal, and a peak value detector for detecting a peak value of the electric signal and holding it.

The output of an arbitrary channel signal light on a transmission line and the transmission output of a signal light to be added are monitored and the transmission output of a transmitter is controlled so that the ratio of one output to the other output becomes constant. The output of the signal light to be added thereby follows the output variation of wavelength-division-multiplexed signal lights on the transmission line. When the ratio is controlled so that both peak outputs at that time become equal to each other, peak outputs of channels are kept even in spite of a variation on the transmission line.

As another aspect, wavelength division multiplexing systems according to the present invention include an optical channel separator for separating wavelength-division-multiplexed signal lights into separate signal lights by wavelength to output the separate signal lights, and a separate signal light output detector for detecting an output of the separate signal light having the maximum output among the separate signal lights. An output controller controls the output of an additional signal light on the basis of the maximum output. The separate signal light output detector includes a third photoelectric converter for converting the separate signal lights into electric signals, and an analog switch for allowing only the maximum output among the electric signals to pass.

Wavelength-division-multiplexed signal lights are separated into separate signal lights by wavelength at the optical divider. Outputs of the separate signal lights are detected, respectively. The output of the additional signal light is controlled with a control signal established on the basis of the above outputs.

An output of the separate signal light having the maximum output among the separate signal lights to control the output of an additional signal but the output of the additional signal light may be controlled in accordance with the minimum output among the separate signal lights. It is also possible that outputs of the separate signal lights are detected and the mean value of them is calculated to use the mean output for controlling the output of an additional signal light.

BRIEF DESCRIPTION OF DRAWINGS

The above and other objects, features and advantages of the present invention will become more apparent from the following detailed description when taken in conjunction with the accompanying drawings wherein.

DETAILED DESCRIPTION OF PREFERRED EMBODIMENTS

Next, wavelength division multiplexing systems according to the present invention will be described in detail with reference to drawings.

Figure 1:
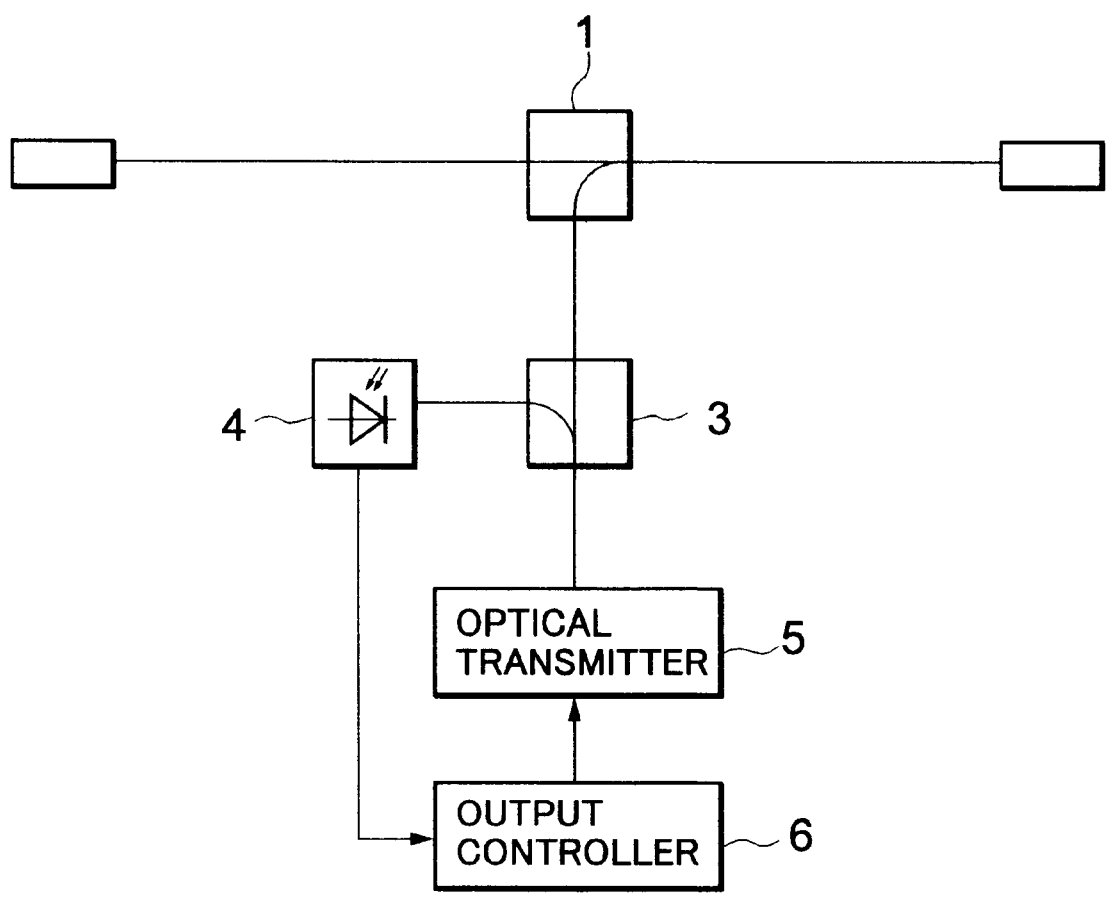
FIG. 1 is a diagram showing a construction of prior art wavelength division multiplexing systems.
Figure 2:
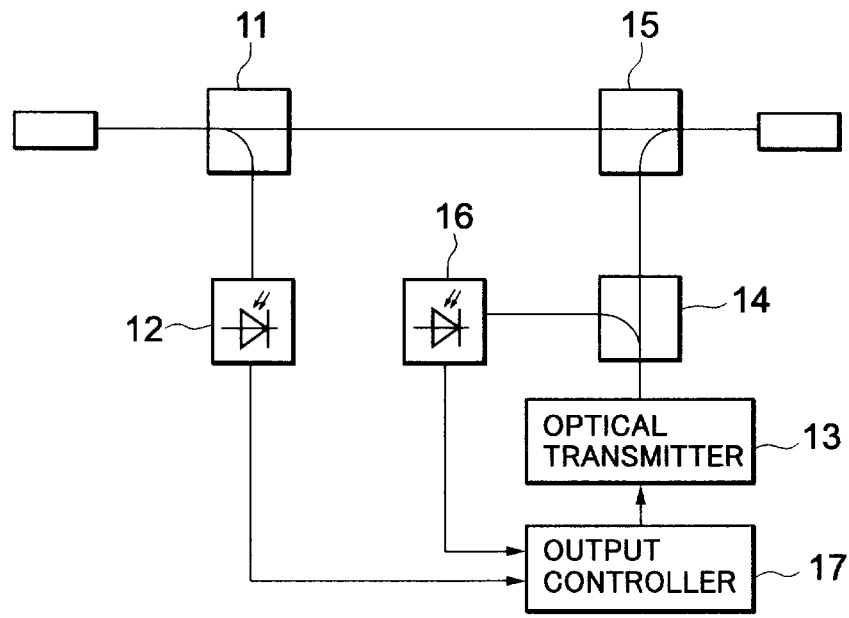
FIG. 2 is a diagram showing a construction of wavelength division multiplexing systems according to the first embodiment of the present invention.

FIG. 2 shows a construction of wavelength division multiplexing systems according to the first embodiment of the present invention.

The wavelength division multiplexing systems according to the first embodiment of the present invention include an optical divider 11, an optical receiver 12, an optical transmitter 13, another optical divider 14, and a photoelectric converter 16. The optical divider 11 divides a signal light or wavelength-division-multiplexed (WDM) signal lights, in which a plurality of signal lights is wavelength-division-multiplexed, transmitted on a transmission line. A divided signal light from the optical divider 11 is converted into an electric signal in the optical receiver 12.

On the other hand, the optical transmitter 13 sends out an additional signal light to be added to the above signal light or lights transmitted on the transmission line. The additional signal light sent out from the optical transmitter 13 is divided in the optical divider 14 and one of the outputs of the optical divider 14 is converted into an electric signal in the photoelectric converter 16.

An optical coupler 15 is disposed on the transmission line. The other output of the optical divider 14 is multiplexed with the signal light or lights on the transmission line in the optical coupler 15.

The signal light or the WDM signal lights, in which a plurality of signal lights is wavelength-division-multiplexed, are input from the left side in FIG. 2. The wavelength division multiplexing systems according to this embodiment have the function that another signal light is added to the input signal light or lights. The signal light to be added is sent out from the optical transmitter 13.

The input signal light or lights are divided in the optical divider 11. One of the outputs of the optical divider 11 is converted into an electric signal in the optical receiver 12 and an output level of the electric signal is detected. The signal light to be added sent out from the optical transmitter 13 is divided in the optical divider 14. One of the divided signal lights is multiplexed with the input signal light or lights in the optical coupler 15 and sent out on the transmission line. The other of the divided signal lights from the optical divider 14 is converted into an electric signal in the photoelectric converter 16 and an output level of the electric signal is detected.

In the above construction, the wavelength division multiplexing systems according to the present invention further include an output controller 17. The output controller 17 controls the output of the optical transmitter 13 so that the ratio of the output level of the optical receiver 12 to the output level of the photoelectric converter 16 becomes constant. Thereby, the ratio is adjusted by the control of the output controller 17 so that the output of the signal light to be added becomes equal to that of each wavelength signal light on the transmission line. The output of the signal light to be added can thereby be controlled to become equal to that of each wavelength signal light on the transmission line. Since an actual output level of the transmitted WDM signal lights is detected immediately before adding a signal light to control the output of the signal light to be added, output adjustment can be performed in high accuracy without depending on any level drop due to a transmission loss of the transmitted signal lights or the like.

By the above construction, when there is always a constant number of channels of signal lights on the transmission line, the output of a signal light to be added can also be controlled so that the ratio of the total optical output of WDM signal lights to the optical output of the additional signal light becomes constant. For instance, if the number of signal lights included by the WDM signal lights transmitted on the transmission line is 4, the optical output of the additional signal light is controlled so that the optical output of the additional signal light always becomes ¼ of the optical output level detected in the photoelectric converter.

Figure 3:
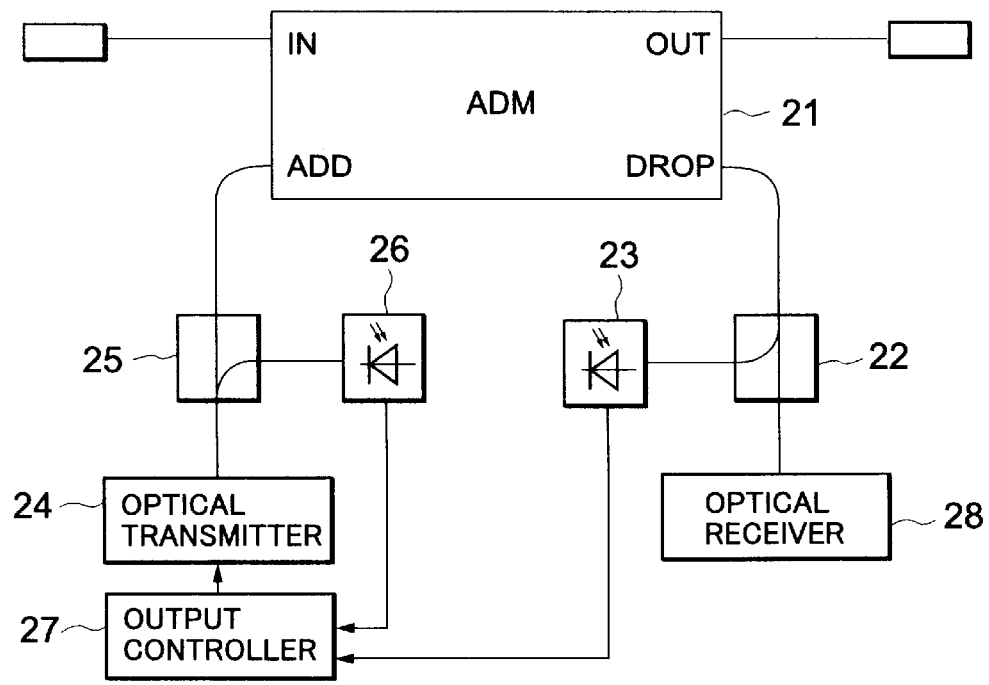
FIG. 3 is a diagram showing a construction of wavelength division multiplexing systems according to the second embodiment of the present invention.

FIG. 3 shows a construction of wavelength division multiplexing systems according to the second embodiment of the present invention.

The wavelength division multiplexing systems according to the second embodiment of the present invention include an optically dividing and adding circuit (hereinafter, called ADM) 21 having the function that a part of signal lights is dropped and extracted from transmitted WDM signal lights and another function that a new signal light is multiplexed with and added to the WDM signal lights. The systems further include an optical divider 22 for dividing a dropped signal light, a photoelectric converter 23 for converting a divided signal light into an electric signal, an optical transmitter 24 for transmitting a signal light to be added to WDM signal lights on a transmission line, another optical divider 25 for dividing a signal light from the optical transmitter 24, and another photoelectric converter 26 for converting a divided signal light from the optical divider 25 into an electric signal.

In the ADM 21, transmitted signal lights are input to an IN port and signal lights are output at an OUT port. The ADM 21 has the function that a signal light having an arbitrary wavelength is selected and dropped from WDM signal lights. The above function can be obtained by using a variable optical band-pass filter, for instance, using an acousto-optic element. A selectively dropped signal light is output at a DROP port.

The ADM 21 has another function that a new signal light is multiplexed with and added to WDM signal lights transmitted on the transmission line. The signal light to be added is input from an ADD port of the ADM 21.

A signal light dropped from the DROP port is divided in the optical divider 22 and one of the outputs of the optical divider 22 is converted into an electric signal in the photoelectric converter 23. The other output is received by an optical receiver 28. An output level of the dropped signal light is detected by using the electric signal converted in the photoelectric converter 23.

On the other hand, the optical transmitter 24 sends out a signal light to be newly added at the ADM 21. The sent-out additional signal light is divided in the optical divider 25 and one of the outputs of the optical divider 25 is input through the ADD port to the ADM 21. The additional signal light input to the ADM 21 is multiplexed with WDM signal lights and sent out on the transmission line.

The other output of the optical divider 25 is converted into an electric signal in the photoelectric converter 26 and an output level of the electric signal is detected. The output levels of the signal lights detected in the photoelectric converters 23 and 26, respectively, are input to an output controller 27. The output of the optical transmitter 24 is controlled by a feedback manner so that levels of the dropped signal light and the additional signal light become almost equal to each other. The feedback control may be performed so that both levels become equal to each other. The output of the optical transmitter 24 can also be controlled so that the ratio of the output of the photoelectric converter 23 to the output of the photoelectric converter 26 becomes constant. By the manner that the ratio is adjusted by the control of the output controller 27 so that the output of the signal light to be added becomes equal to that of each wavelength signal light on the transmission line, the output of the signal light to be added can be controlled to become equal to that of each wavelength signal light on the transmission line without depending on a transmission loss.

In this embodiment and embodiments described below, since the basic construction and function are same as those of the wavelength division multiplexing systems of the present invention shown in FIG. 2, descriptions of them will be omitted.

This embodiment differs from the first embodiment in that this embodiment includes the ADM 21. The ADM 21 has functions that input WDM signal lights are not only divided but the signal light having a specific wavelength is selectively dropped and extracted from the WDM signal lights and another signal light having another specific wavelength is added to the WDM signal lights.

Figure 4:
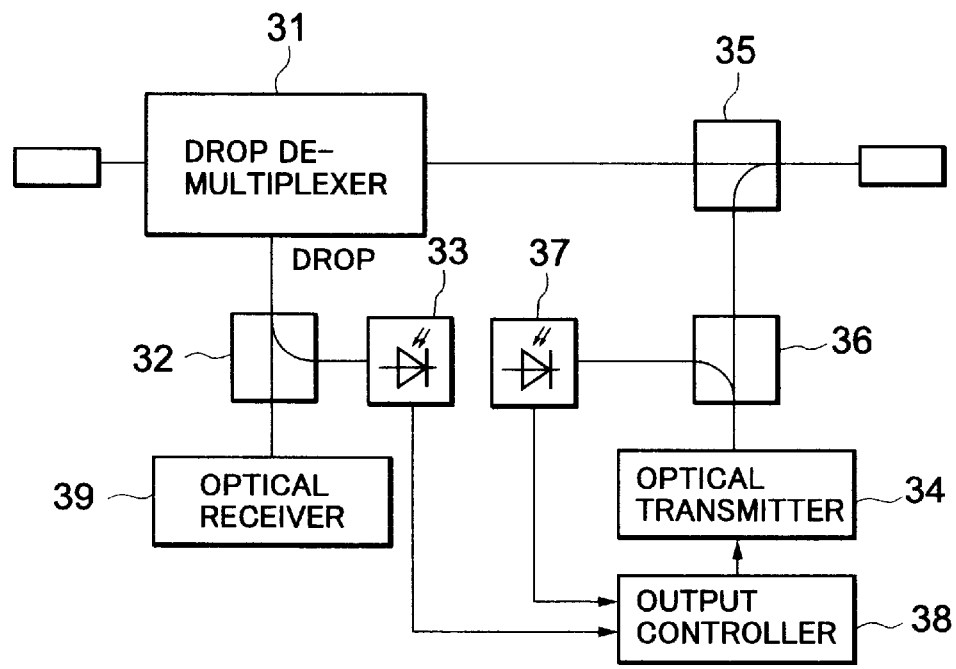
FIG. 4 is a diagram showing a construction of wavelength division multiplexing systems according to the third embodiment of the present invention.

FIG. 4 shows a construction of wavelength division multiplexing systems according to the third embodiment of the present invention.

The wavelength division multiplexing systems according to the third embodiment of the present invention include a drop de-multiplexer (DROP) 31 for dropping the signal light having a specific wavelength from WDM signal lights, an optical divider 32 for dividing the dropped signal light, a photoelectric converter 33 for converting a divided signal light into an electric signal, an optical transmitter 34 for transmitting a signal light to be added to the WDM signal lights on a transmission line, an optical coupler 35 for adding the signal light from the optical transmitter 34 to the WDM signal lights on the transmission line, another optical divider 36 for dividing the signal light from the optical transmitter 34, and another photoelectric converter 37 for converting a divided signal light from the optical divider 36 into an electric signal.

The drop de-multiplexer 31 also has the function that a specific wavelength is selected and dropped. In this wavelength division multiplexing systems, a dropped signal light is divided in the optical divider 32 and one component of the signal light is used for detecting its output level. The other component signal light is converted into an electric signal in an optical receiver 39 and the signal is received.

Figure 5:
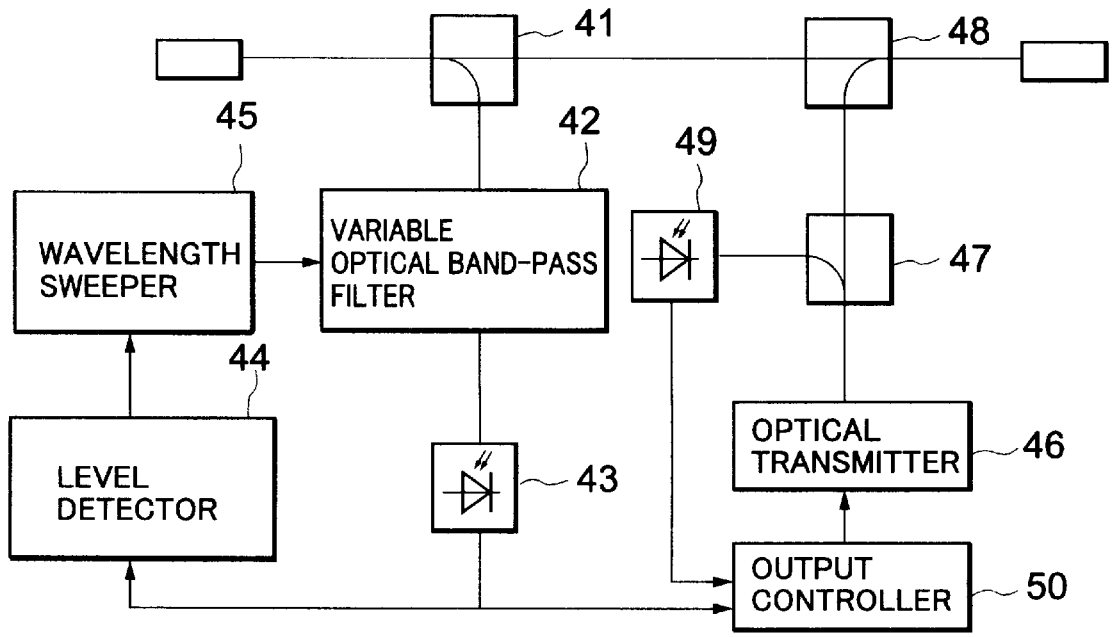
FIG. 5 is a diagram showing a construction of wavelength division multiplexing systems according to the fourth embodiment of the present invention.

Also in this embodiment, an output controller 38 controls the output of the optical transmitter 34 so that the ratio of the output of the photoelectric converter 33 to the output of the photoelectric converter 37 becomes constant. By the manner that the ratio is adjusted by the control of the output controller 38 so that the output of the signal light to be added becomes equal to that of each wavelength signal light on the transmission line, the output of the signal light to be added can be controlled to become equal to that of each wavelength signal light on the transmission line without depending on a transmission loss. FIG. 5 shows a construction of wavelength division multiplexing systems according to the fourth embodiment of the present invention.

The wavelength division multiplexing systems according to the fourth embodiment of the present invention include an optical divider 41 for dividing WDM signal lights on a transmission line, a variable optical band-pass filter 42 controlled by a driver 45, a photoelectric converter 43 for converting the output of the variable optical band-pass filter 42, and the driver 45 for driving the output of the variable optical band-pass filter 42.

In this embodiment, a peak detector 44 is provided and the variable optical band-pass filter 42 is swept by wavelength and the control signal to the driver 45 is locked so that the output of the photoelectric converter 43 becomes maximum. The systems further include an optical transmitter 46 for transmitting a signal light to be added to WDM signal lights on the transmission line, an optical coupler 48 for adding the signal light from the optical transmitter 46 to the WDM signal lights on the transmission line, an optical divider 47 for dividing the signal light from the optical transmitter 46, and a photoelectric converter 49 for converting a divided signal light from the optical divider 47 into an electric signal. For instance, an acousto-optic tunable filter (AOTF) or the like can be used for realizing the function that the signal light having a specific wavelength is selected from and taken out of multiplexed signal lights.

Also in this embodiment, an output controller 50 controls the output of the optical transmitter 46 so that the ratio of the output of the photoelectric converter43 to the output of the photoelectric converter 49 becomes constant. By the manner that the ratio is adjusted by the control of the output controller 50 so that the output of the signal light to be added becomes equal to that of each wavelength signal light on the transmission line, the output of the signal light to be added can be controlled to become equal to that of each wavelength signal light on the transmission line without depending on a transmission loss. For the variable optical band-pass filter 42, an acousto-optic tunable filter, an electro-optic tunable filter or the like can be used.

Figure 6:
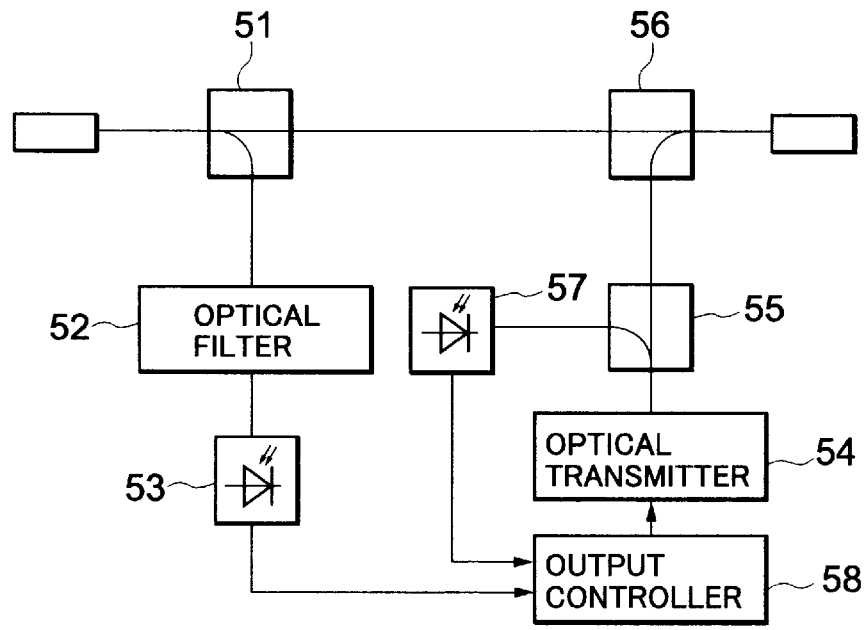
FIG. 6 is a diagram showing a construction of wavelength division multiplexing systems according to the fifth embodiment of the present invention.

FIG. 6 shows a construction of wavelength division multiplexing systems according to the fifth embodiment of the present invention.

The wavelength division multiplexing systems according to the fifth embodiment of the present invention include an optical divider 51 for dividing WDM signal lights on a transmission line, a photoelectric converter 53 for performing a photoelectric conversion, an optical transmitter 54 for transmitting a signal light to be added to the WDM signal lights on the transmission line, another optical divider 55 for dividing the signal light from the optical transmitter 54, an optical coupler 56 for adding the signal light from the optical transmitter 54 to the WDM signal lights on the transmission line, and another photoelectric converter 57 for converting a divided signal light from the optical divider 55 into an electric signal.

In this embodiment, there is disposed an optical filter 52 for allowing only a predetermined channel among divided signal lights from the optical divider 51 to pass. A signal light which permeated through the optical filter 52 is converted into an electric signal in the photoelectric converter 53 to detect its output. An output controller 58 controls the output of the optical transmitter 54 so that the ratio of the output of the photoelectric converter 53 to the output of the photoelectric converter 57 becomes constant. The ratio is adjusted by the control of the output controller 58 so that the output of the signal light to be added becomes equal to that of each wavelength signal light on the transmission line. Thereby, the output of the signal light to be added can be controlled to become equal to that of each wavelength signal light on the transmission line without depending on a transmission loss.

Figure 7:
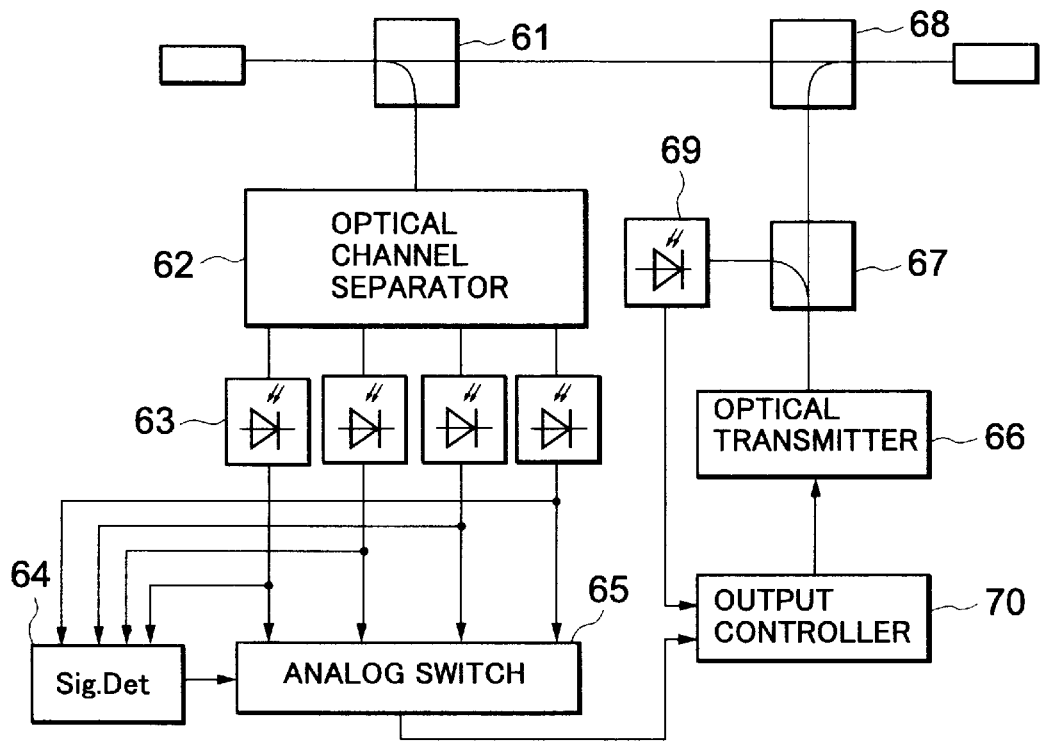
FIG. 7 is a diagram showing a construction of wavelength division multiplexing systems according to the sixth embodiment of the present invention.

FIG. 7 shows a construction of wavelength division multiplexing systems according to the sixth embodiment of the present invention.

The wavelength division multiplexing systems according to the sixth embodiment of the present invention include an optical divider 61 for dividing WDM signal lights on a transmission line, an optical channel separator 62 for separating divided signal lights by channel, photoelectric converters 63 for converting each channel output of the optical channel separator 62 into an electric signal, and a detector 64 for detecting the channel the output at which is maximum among the outputs of the photoelectric converter 63 and outputting a signal for selecting that channel. In this embodiment, only the maximum output among the outputs of the photoelectric converter 63 can pass through an analog switch 65 in accordance with a control signal from the detector 64. As this manner, the output of a signal light to be added is thus established in accordance with the maximum output among the outputs of the signal lights which were converted into electric signals in the photoelectric converter 63.

Otherwise, the output of the signal light to be added can be established in accordance with the minimum output among the outputs of the signal lights. It is also possible that the mean value of the outputs of the signal lights is calculated and the output of the signal light to be added is established in accordance with the mean value.

The systems further include an optical transmitter 66 for transmitting a signal light to be added to WDM signal lights on the transmission line, an optical coupler 68 for adding the signal light from the optical transmitter 66 to the WDM signal lights on the transmission line, another optical divider 67 for dividing the signal light from the optical transmitter 66, and another photoelectric converter 69 for converting a divided signal light from the optical divider 67. An output controller 70 controls the output of the optical transmitter 66 so that the ratio of the output of the analog switch 65 to the output of the photoelectric converter 69 becomes constant.

The ratio is adjusted by the control of the output controller 70 so that the output of the signal light to be added becomes equal to that of each wavelength signal light on the transmission line. Thereby, the output of the signal light to be added can be controlled to become equal to that of each wavelength signal light on the transmission line without depending on a transmission loss.

As described above, in wavelength division multiplexing systems according to the present invention, when a new signal light is added to WDM signal lights on a transmission line, the optical power of the signal light to be added can automatically be fitted to the optical power on the transmission line without depending on any output variation of the WDM signal lights on the transmission line. Thereby, the S/N ratio is prevented from deteriorating and a high quality optical transmission can be realized.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. Wavelength division multiplexing system comprising:
   first optical output level detection means for detecting an optical output level of a first signal light transmitted on a transmission line to output a first optical output level;
   signal light transmission means for transmitting a second signal light;
   signal light coupling means for multiplexing said second signal light with said first signal light to add said second signal light onto said transmission line; and
   optical output control means for controlling the optical output level of said second signal light on the basis of said first optical output level.

2. Wavelength division multiplexing system according to claim 1, further comprising:
   second optical output level detection means for detecting an optical output level of said second signal light to output a second optical output level.

3. Wavelength division multiplexing system according to claim 2, wherein said output control means comprises:
   means for controlling the optical output level of said second signal light so that the ratio of said first optical output level to said second optical output level is within a predetermined range.

4. Wavelength division multiplexing system according to claim 2, wherein
   said output control means comprises:
   means for controlling the optical output level of said second signal light so that said first optical output level and said second optical output level become equal to each other.

5. Wavelength division multiplexing system according to claim 3, wherein
   said signal light transmission means comprises:
   an optical semiconductor laser for outputting said second signal light; and
   said output control means comprises:
   optical semiconductor laser control means for controlling the injection current to said optical semiconductor laser.

6. Wavelength division multiplexing system according to claim 3, wherein
   said first optical output level detection means comprises:
   first optically dividing means for dividing said first signal light to output a first divided signal light; and
   first photoelectric conversion means for converting said first divided signal light into a first electric signal; and
   said second optical output level detection means comprises:
   second optically dividing means for dividing said second signal light to output a second divided signal light; and
   second photoelectric conversion means for converting said second divided signal light into a second electric signal.

7. Wavelength division multiplexing system according to claim 1, wherein
   said first signal light comprises wavelength-division-multiplexed signal lights in which a plurality of signal lights having different wavelengths from one another is wavelength-division-multiplexed; and said output control means comprises:
means for controlling the optical output level of said second signal light so that said first optical output level to said second optical output level becomes the same multiple as the number of said signal lights included by said wavelength-division-multiplexed signal lights.

8. Wavelength division multiplexing system according to claim 7, wherein said signal light transmission means comprises:
an optical semiconductor laser for outputting said second signal light; and said output control means comprises:
optical semiconductor laser control means for controlling the injection current to said optical semiconductor laser.

9. Wavelength division multiplexing system according to claim 8, wherein said first optical output level detection means comprises:
a first optically dividing means for dividing said first signal light to output a first divided signal light; and
first photoelectric conversion means for converting said first divided signal light into a first electric signal; and said second optical output level detection means comprises:
second optically dividing means for dividing said second signal light to output a second divided signal light; and
second photoelectric conversion means for converting said second divided signal light into a second electric signal.

10. Wavelength division multiplexing system comprising:
wavelength-division-multiplexed signal lights input means for inputting wavelength-division-multiplexed signal lights in which a plurality of signal lights having different wavelengths from one another are wavelength-division-multiplexed, said wavelength-division-multiplexed signal lights being transmitted on a transmission line;
signal light extraction means for extracting the signal light having a specific wavelength from said wavelength-division-multiplexed signal lights to output a dropped signal light;
first optical output level detection means for detecting an optical output level of said dropped signal light to output a first optical output level;
signal light transmission means for transmitting an additional signal light;
signal light addition means for outputting said additional signal light onto said transmission line after being multiplexed with said wavelength-division-multiplexed signal lights; and
optical output control means for controlling the optical output of said additional signal light on the basis of said first optical output level.

11. Wavelength division multiplexing system according to claim 10, further comprising:
second optical output level detection means for detecting an optical output level of said additional signal light to output a second optical output level.

12. Wavelength division multiplexing system according to claim 11, wherein said output control means comprises:

means for controlling the optical output level of said additional signal light so that the ratio of said first optical output level to said second optical output level is within a predetermined range.

13. Wavelength division multiplexing system according to claim 11, wherein said output control means comprises:
means for controlling the optical output level of said additional signal light so that said first optical output level and said second optical output level become equal to each other.

14. Wavelength division multiplexing system according to claim 11, wherein said signal light extraction means comprises:
an optical filter for allowing only said signal light having said specific wavelength selectively to permeate.

15. Wavelength division multiplexing system according to claim 11, wherein said signal light extraction means comprises:
a variable optical band-pass filter for selecting an arbitrary wavelength with an external signal to extract said signal light having said specific wavelength.

16. Wavelength division multiplexing system according to claim 15, wherein said variable optical band-pass filter comprises:
an acousto-optic tunable filter.

17. Wavelength division multiplexing system according to claim 12, wherein said signal light transmission means comprises:
an optical semiconductor laser for outputting said additional signal light; and said output control means comprises:
optical semiconductor laser control means for controlling the injection current to said optical semiconductor laser.

18. Wavelength division multiplexing system according to claim 12, wherein said first optical output level detection means comprises:
first optically dividing means for dividing said wavelength-division-multiplexed signal lights to output a first divided signal light; and
first photoelectric conversion means for converting said first divided signal light into a first electric signal; and said second optical output level detection means comprises:
second optically dividing means for dividing said additional signal light to output a second divided signal light; and
second photoelectric conversion means for converting said second divided signal light into a second electric signal.

19. Wavelength division multiplexing system, comprising:
wavelength-division-multiplexed signal lights input means for inputting wavelength-division-multiplexed signal lights in which a plurality of signal lights having different wavelengths from one another are wavelength-division-multiplexed, said wavelength-division-multiplexed signal lights being transmitted on a transmission line;
maximum optical output level detection means for detecting an optical output level of the signal light having the maximum peak output among said plurality of signal lights included by said wavelength-division-multiplexed signal lights; signal light transmission means for transmitting an additional signal light;

signal light addition means for outputting said additional signal light onto said transmission line after being multiplexed with said wavelength-division-multiplexed signal lights; and optical output control means for controlling the optical output of said additional signal light on the basis of said maximum peak output.

20. Wavelength division multiplexing system according to claim 19, further comprising:

additional signal light output level detection means for detecting an optical output level of said additional signal light to output an additional signal light output level.

21. Wavelength division multiplexing system according to claim 20, wherein said output control means comprises:

means for controlling the optical output level of said additional signal light so that the ratio of said maximum peak output to said additional signal light output level is within a predetermined range.

22. Wavelength division multiplexing system according to claim 20, wherein said output control means comprises:
means for controlling the optical output level of said additional signal light so that the peak output of said additional signal light becomes equal to said maximum peak output.

23. Wavelength division multiplexing system according to claim 20, wherein said signal light transmission means comprises:
an optical semiconductor laser for outputting said additional signal light; and
said output control means comprises:
optical semiconductor laser control means for controlling the injection current to said optical semiconductor laser.

24. Wavelength division multiplexing system according to claim 20, wherein said maximum peak output detection means comprises:
first optically dividing means for dividing said wavelength-division-multiplexed signal lights to output a first divided signal light; and
first photoelectric conversion means for converting said first divided signal light into a first electric signal; and said additional signal light output level detection means comprises:
second optically dividing means for dividing said additional signal light to output a second divided signal light; and
second photoelectric conversion means for converting said second divided signal light into a second electric signal.

25. Wavelength division multiplexing system according to claim 19, wherein said maximum peak output detection means comprises:
a variable optical band-pass filter for allowing only the signal light having a specific wavelength among said wavelength-division-multiplexed signal lights to permeate to output a permeation signal light;
wavelength sweep means for sweeping over wavelength by varying said specific wavelength of said variable optical band-pass filter;
third photoelectric conversion means for converting said permeation signal light into an electric signal; and
peak value detection means for detecting and hold a peak value of said electric signal.

26. Wavelength division multiplexing system, comprising:

wavelength-division-multiplexed signal lights input means for inputting wavelength-division-multiplexed signal lights in which a plurality of signal lights having different wavelengths from one another are wavelength-division-multiplexed, said wavelength-division-multiplexed signal lights being transmitted on a transmission line;

channel separation means for separating said wavelength-division-multiplexed signal lights into said signal lights by wavelength to output the separate signal lights;

signal light transmission means for transmitting an additional signal light;

signal light addition means for outputting said additional signal light onto said transmission line after being multiplexed with said wavelength-division-multiplexed signal lights;

separate signal light output detection means for detecting outputs of said separate signal lights to output a control signal; and additional signal light control means for controlling the output of said additional signal light on the basis of said control signal.

27. Wavelength division multiplexing system according to claim 26, wherein said separate signal light output detection means comprises:
maximum optical output detection means for detecting an output of the separate signal light having the maximum output among said separate signal lights to output the maximum output; and
control means for outputting said control signal in accordance with said maximum output.

28. Wavelength division multiplexing system according to claim 27, wherein said separate signal light output detection means further comprises:
third photoelectric conversion means for converting said separate signal lights into electric signals, respectively; and
an analog switch for allowing only the maximum output among said electric signals to pass.

29. Wavelength division multiplexing system according to claim 27, further comprising:

an optical receiver for receiving at least one signal light among said wavelength-division-multiplexed signal lights.

30. Wavelength division multiplexing system according to claim 26, wherein said separate signal light output detection means comprises:
minimum optical output detection means for detecting an output of the separate signal light having the minimum output among said separate signal lights to output the minimum output; and
control means for outputting said control signal on the basis of said minimum output.

31. Wavelength division multiplexing system according to claim 30, wherein said separate signal light output detection means further comprises:
    third photoelectric conversion means for converting said separate signal lights into electric signals, respectively; and
    an analog switch for allowing only the minimum output among said electric signals to pass.

32. Wavelength division multiplexing system according to claim 31, further comprising:
    an optical receiver for receiving at least one signal light among said wavelength-division-multiplexed signal lights.

33. Wavelength division multiplexing system according to claim 26, wherein
    said separate signal light output detection means further comprises:
        mean optical output detection means for detecting outputs of said separate signal lights and calculating the mean value of them to output a mean output; and
        control means for outputting said control signal on the basis of said mean output.

34. Wavelength division multiplexing system according to claim 33, wherein
    said separate signal light output detection means further comprises:
        third photoelectric conversion means for converting said separate signal lights into electric signals, respectively; and
        mean value calculation means for calculating the mean value of said electric signals.

35. Wavelength division multiplexing system according to claim 34, further comprising:
    an optical receiver for receiving at least one signal light among said wavelength-division-multiplexed signal lights.

36. Wavelength division multiplexing system according to claim 26, wherein
    said signal light transmission means comprises:
        an optical semiconductor laser for outputting said additional signal light; and
    said additional signal light control means comprises:
        optical semiconductor laser control means for controlling the injection current to said optical semiconductor laser.

37. Wavelength division multiplexing system according to claim 36, wherein
    said maximum peak output detection means comprises:
        first optically dividing means for dividing said wavelength-division-multiplexed signal lights to output a first divided signal light; and
        first photoelectric conversion means for converting said first divided signal light into a first electric signal; and
    said additional signal light output level detection means comprises:
        second optically dividing means for dividing said additional signal light to output a second divided signal light; and
        second photoelectric conversion means for converting said second divided signal light into a second electric signal.

* * * * *